US011128380B2

(12) United States Patent
Matsumoto et al.

(10) Patent No.: US 11,128,380 B2
(45) Date of Patent: Sep. 21, 2021

(54) SIGNAL LIGHT INTERRUPTION DETECTION DEVICE, OPTICAL AMPLIFIER, OPTICAL WAVELENGTH MULTIPLEX TRANSMISSION DEVICE, AND OPTICAL WAVELENGTH MULTIPLEX TRANSMISSION SYSTEM

(71) Applicant: Mitsubishi Electric Corporation, Chiyoda-ku (JP)

(72) Inventors: Kanehiro Matsumoto, Tokyo (JP); Toshiyuki Tokura, Tokyo (JP); Shun Chikamori, Tokyo (JP); Kengo Takata, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 501 days.

(21) Appl. No.: 16/072,009

(22) PCT Filed: Feb. 5, 2016

(86) PCT No.: PCT/JP2016/053481
§ 371 (c)(1),
(2) Date: Jul. 23, 2018

(87) PCT Pub. No.: WO2017/134813
PCT Pub. Date: Aug. 10, 2017

(65) Prior Publication Data
US 2019/0028202 A1    Jan. 24, 2019

(51) Int. Cl.
*H04B 10/296* (2013.01)
*H04B 10/079* (2013.01)
(Continued)

(52) U.S. Cl.
CPC ....... *H04B 10/296* (2013.01); *H01S 3/06754* (2013.01); *H01S 3/10015* (2013.01);
(Continued)

(58) Field of Classification Search
None
See application file for complete search history.

(56) References Cited

U.S. PATENT DOCUMENTS 6,373,621 B1 *  4/2002  Large .................... H01S 3/302
                                                           359/334
6,456,428 B1 *  9/2002  Nakaji ................ H01S 3/06754
                                                          359/341.41
(Continued)

FOREIGN PATENT DOCUMENTS

| JP | 2001-144692 A | 5/2001 |
| JP | 2001-358658 A | 12/2001 |
| JP | 2015-97302 A  | 5/2015 |

OTHER PUBLICATIONS

European Communication Pursuant to Article 94(3) EPC dated May 19, 2020 in Patent Application No. 16 889 299.0, 6 pages.
(Continued)

*Primary Examiner* — Eric L Bolda
(74) *Attorney, Agent, or Firm* — Oblon, McClelland, Maier & Neustadt, L.L.P.

(57) ABSTRACT

A signal light interruption detection device includes an optical interleaver to demultiplex wavelength-multiplexed light into light in first frequency ranges corresponding to a first frequency grid including frequencies at regular frequency intervals in which a main signal light component can be arranged and light in second frequency ranges corresponding to a second frequency grid shifted from the first frequency grid by a half cycle of the regular frequency intervals, a first optical detector to detect first light power as total power of the light in the first frequency ranges, a second optical detector to detect second light power as total power of the light in the second frequency ranges, and a judgment unit to output a notification signal based on a difference between the first light power detected by the first optical
(Continued)

detector and the second light power detected by the second optical detector.

9 Claims, 11 Drawing Sheets

(51) Int. Cl.
    *H04B 10/294* (2013.01)
    *H01S 3/067* (2006.01)
    *H01S 3/30* (2006.01)
    *H01S 3/10* (2006.01)

(52) U.S. Cl.
    CPC ........... *H01S 3/302* (2013.01); *H04B 10/079* (2013.01); *H04B 10/07953* (2013.01); *H04B 10/07955* (2013.01); *H04B 10/294* (2013.01); *H01S 2301/02* (2013.01)

(56) References Cited

U.S. PATENT DOCUMENTS

| | | | | |
|---|---|---|---|---|
| 6,560,008 | B1* | 5/2003 | Wada | H01S 3/1301 359/337 |
| 2003/0123134 | A1 | 7/2003 | Wada | |
| 2004/0196158 | A1* | 10/2004 | Sugaya | H04B 10/2916 340/815.4 |
| 2004/0246466 | A1 | 12/2004 | Hunsche | |
| 2007/0065147 | A1* | 3/2007 | Qiao | H04B 10/07953 398/26 |
| 2011/0211829 | A1* | 9/2011 | Schimpe | H04B 10/0791 398/33 |

OTHER PUBLICATIONS

Office Action dated Aug. 27, 2019 in Japanese Patent Application No. 2017-565365 (with unedited computer generated English translation), 10 pages.
Combined Chinese Office Action and Search Report dated Jun. 22, 2020 in corresponding Chinese Patent Application No. 201680079566.5 (with English Translation and English Translation of Category of Cited Documents), 17 pages.
Japanese Office Action dated Mar. 17, 2020 in Patent Application No. 2017-565365 (with English translation), 6 pages.
Extended European Search Report dated Jan. 31, 2019 in Patent Application No. 16889299.0, 7 pages.
Office Action dated Feb. 12, 2019 in Japanese Patent Application No. 2017-565365 (with unedited computer generated English translation).
Chinese Office Action dated Mar. 10, 2021 in Chinese Patent Application No. 201630079566.5 (with unedited computer generated English translation), 14 pages.
International Search Report dated Mar. 29, 2016 in PCT/JP2016/053481 filed Feb. 5, 2016.

\* cited by examiner

SIGNAL LIGHT INTERRUPTION DETECTION DEVICE, OPTICAL AMPLIFIER, OPTICAL WAVELENGTH MULTIPLEX TRANSMISSION DEVICE, AND OPTICAL WAVELENGTH MULTIPLEX TRANSMISSION SYSTEM

TECHNICAL FIELD

The present invention relates to a signal light interruption detection device that detects a signal light interruption state in a fiber-optic transmission line, an optical amplifier including the signal light interruption detection device, an optical wavelength multiplex transmission device including the signal light interruption detection device, and an optical wavelength multiplex transmission system including the optical wavelength multiplex transmission device.

BACKGROUND ART

To recent years, to deal with the increase in communication traffic, wavelength division multiplexing for increasing the number of signal lights that can be communicated through one optical fiber (the number of signal lights differing in the wavelength band) is performed in fiber-optic communication systems such as submarine cable systems and land-based WDM (Wavelength Division Multiplexing) systems.

Further, thanks to the increase in bandwidth and output power of EDFAs (Erbium-Doped Fiber Amplifiers: rare earth-doped optical fiber amplifiers) as optical amplifiers, ultralong distance transmission of 100 Gbps high-speed signal light, which is mainstream in fiber-optic communication systems for trunk lines, is possible.

On the other hand, in fiber-optic communication systems, EDFAs and Raman amplifiers are used as optical amplifiers in order to secure an excellent OSNR (Optical Signal-Noise Ratio: ratio of optical signal power to noise power). For example, when a Raman amplifier is employed for an optical fiber transmitting signal light in a 1550 nm wavelength band, Raman excitation light in a 1490 nm band contributing to Raman amplification is generally inputted from an optical wavelength multiplex transmission device on the receiving side (optical receiver) to the optical fiber via an optical coupler towards the signal, light transmitting side. At that time, ASE (Amplified Spontaneous Emission) noise light in the signal band is emitted towards the signal light receiving side. Incidentally, there are also cases where the Raman excitation light is inputted to the optical fiber from an optical wavelength multiplex transmission device on the transmitting side (optical transmitter).

In fiber-optic communication systems employing an EDFA or a Raman amplifier, a mechanism for detecting the signal light interruption state is necessary since the light power of the ASE noise light inputted to a signal light interruption detection unit of the optical wavelength multiplex transmission device on the receiving side tends to be high. Patent Reference 1 provides a method of extracting a main signal light component at a single wavelength by use of an optical bandpass filter and making a comparison between the main signal light component and noise light components.

PRIOR ART REFERENCE

Patent Reference

Patent Reference 1: Japanese Patent Application Publication No. 2001-359658

SUMMARY OF THE INVENTION

Problem to be Solved by the Invention

However, the above-described conventional technology, being a method of detecting the signal light interruption state in regard to a main signal light component at a single wavelength, needs to employ a variable frequency filter, when the technology is applied to a fiber-optic communication system transmitting wavelength-multiplexed light including main signal light components at arbitrary wavelengths, and thus there is a problem in that the configuration is necessitated to be complicated.

Further, noise light components in wavelength bands other than the wavelength band (frequency band) of the main signal light component have narrow wavelength bandwidths compared to the wavelength band of the main signal light component and the levels of such noise light components are unstable, and thus there is a problem in that it is difficult to detect the signal light interruption state with high reliability by comparing the light power (electric power) of the main signal light component at a single wavelength with the light power (electric power) of the noise light components.

Furthermore, in cases where the reception level of the main signal light component in the wavelength band (frequency band) including the main signal light component is just slightly higher than the level of the noise light component in the same band, there is a problem in that it is difficult to detect the signal light interruption state with high reliability by comparing the level of the main signal light component at a single wavelength with the level of the noise light component.

The object of the present invention, which has been made to resolve the above-described problems, is to provide a signal light interruption detection device, an optical amplifier, an optical wavelength multiplex transmission device and an optical wavelength multiplex transmission system capable of detecting the signal light interruption state with high reliability in a fiber-optic transmission line transmitting wavelength-multiplexed light without the need of employing a complicated configuration.

Means for Solving the Problem

A signal light interruption detection device according to an aspect of the present invention comprises an optical interleaver to demultiplex wavelength-multiplexed light into light in first frequency ranges corresponding to a first frequency grid including frequencies at regular frequency intervals in which a main signal light component can be arranged and light in second frequency ranges corresponding to a second frequency grid shifted from the first frequency grid by a half cycle of the regular frequency intervals, a first optical detector to detect first light power as total power of the light in the first frequency ranges, a second optical detector to detect second light power as total power of the light in the second frequency ranges, and a judgment unit to output a notification signal based on a difference between the first light power detected by the first optical detector and the second light power detected by the second optical detector.

An optical amplifier according to another aspect of the present invention comprises a Raman amplifier provided in a fiber-optic transmission line in which the wavelength-multiplexed light is transmitted and the signal light interruption detection device provided in the fiber-optic transmission line.

An optical wavelength multiplex transmission device according to another aspect of the present invention comprises an optical transceiver, an optical demultiplexer to output signal light, obtained by demultiplexing wavelength-multiplexed light transmitted through a fiber-optic transmission line, to the optical transceiver, and the signal light interruption detection device provided in the fiber-optic transmission line.

An optical wavelength multiplex transmission system according to another aspect of the present invention comprises a first optical wavelength multiplex transmission device and a second optical wavelength multiplex transmission device communicatively connected with the first optical wavelength multiplex transmission device via a fiber-optic transmission line. At least one of the first optical wavelength multiplex transmission device and the second optical wavelength multiplex transmission device includes an optical transceiver, an optical demultiplexer to output signal light, obtained by demultiplexing wavelength-multiplexed light transmitted through the fiber-optic transmission line, to the optical transceiver, and the signal light interruption detection device provided in the fiber-optic transmission line.

Effects of the Invention

According to the present invention, an effect is achieved in that the signal light interruption state can be detected with high reliability in a fiber-optic transmission line transmitting wavelength-multiplexed light without the need of employing a complicated configuration.

MODE FOR CARRYING OUT THE INVENTION

First Embodiment

Figure 1:
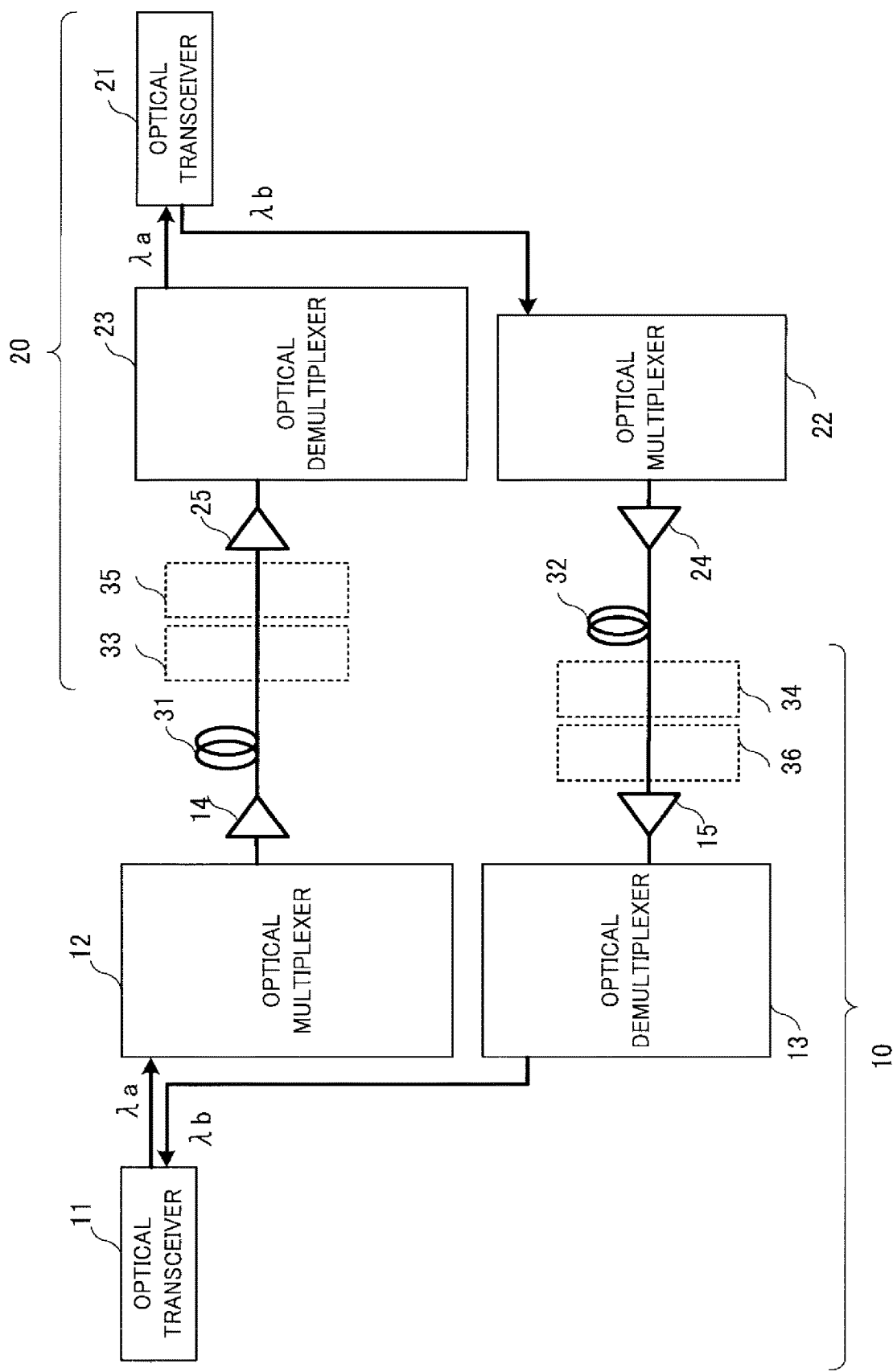
FIG. 1 is a diagram schematically showing configurations of an optical wavelength multiplex transmission device and an optical wavelength multiplex transmission system according to a first embodiment of the present invention.

FIG. 1 is a diagram schematically showing configurations of an optical wavelength multiplex transmission device and an optical wavelength multiplex transmission system according to a first embodiment of the present invention. The optical wavelength multiplex transmission system according to the first embodiment is a fiber-optic communication system in which signal light is transmitted via fiber-optic transmission lines. The optical wavelength multiplex transmission system according to the first embodiment includes an optical wavelength multiplex transmission device 10 as a first optical wavelength multiplex transmission device and an optical wavelength multiplex transmission device 20 as a second optical wavelength multiplex transmission device communicatively connected with the optical wavelength multiplex transmission device 10 via fiber-optic transmission lines 31 and 32. In general, the optical wavelength multiplex transmission device 10 and the optical wavelength multiplex transmission device 20 have the same configuration and functions. Thus, it is permissible even if the first optical wavelength multiplex transmission device is the optical wavelength multiplex transmission device 20 and the second optical wavelength multiplex transmission device is the optical wavelength multiplex transmission device 10.

The optical wavelength multiplex transmission device 10 includes an optical transceiver 11, an optical multiplexer 12 capable of multiplexing signal light at a wavelength λa outputted from the optical transceiver 11 and signal light at another wavelength (not shown in FIG. 1), and an optical demultiplexer 13 capable of demultiplexing received wavelength-multiplexed light and obtaining signal light at a wavelength λb. The wavelengths λa and λb can be the same wavelength. The optical wavelength multiplex transmission device 10 may include an optical amplifier 14 that amplifies wavelength-multiplexed light to be sent out to the fiber-optic transmission line 31. Further, the optical wavelength multiplex transmission device 10 may include an optical amplifier 15 that amplifies wavelength-multiplexed light inputted via the fiber-optic transmission line 32. The optical amplifiers 14 and 15 are EDFAs, for example. Furthermore, the optical wavelength multiplex transmission device 10 may include a Raman amplifier 34 that amplifies the wavelength-multiplexed light inputted via the fiber-optic transmission line 32. Moreover, the optical wavelength multiplex transmission device 10 may include a signal light interruption detection device 36 that detects whether or not the wavelength-multiplexed light inputted via the fiber-optic transmission line 32 is in a signal light interruption state in which no main signal light component exists.

The optical wavelength multiplex transmission device 20 includes an optical transceiver 21, an optical multiplexer 22 capable of multiplexing signal light at the wavelength λb outputted from the optical transceiver 21 and signal light at another wavelength (not shown in FIG. 1), and an optical demultiplexer 23 capable of demultiplexing received wavelength-multiplexed light and obtaining signal light at the wavelength λa. The optical wavelength multiplex transmission device 20 may include an optical amplifier 24 that amplifies wavelength-multiplexed light to be sent out to the fiber-optic transmission line 32. Further, the optical wavelength multiplex transmission device 20 may include an optical amplifier 25 that amplifies wavelength-multiplexed light inputted via the fiber-optic transmission line 31. The optical amplifiers 24 and 25 are EDFAs, for example. Furthermore, the optical wavelength multiplex transmission device 20 may include a Raman amplifier 33 that amplifies the wavelength-multiplexed light inputted via the fiber-optic transmission line 31. Moreover, the optical wavelength multiplex transmission device 20 may include a signal light interruption detection device 35 that detects whether or riot the wavelength-multiplexed light inputted via the fiber-optic transmission line 31 is in the signal light interruption state in which no main signal light component exists. The Raman amplifier 33 and the Raman amplifier 34 have the same configuration and functions. The signal light interruption detection device 35 and the signal light interruption detection device 36 can have the same configuration and functions.

In the optical wavelength multiplex transmission system according to the first embodiment, the optical transceiver 11 outputs signal light at the wavelength λa. The signal light at the wavelength λa is multiplexed with signal light at another wavelength by the optical multiplexer 12, is amplified by the optical amplifier 14, and is sent out to the fiber-optic transmission line 31. FIG. 1 shows a case where no signal light at another wavelength is inputted to the optical multiplexer 12. The signal light is amplified by the Raman amplifier 33, passes through the signal light interruption detection device 35, is amplified by the optical amplifier 25, and is inputted to the optical demultiplexer 23. The signal light inputted to the optical demultiplexer 23 is demultiplexed and signal light at the wavelength λa obtained by the demultiplexing is inputted to the optical transceiver 21.

Further, in the optical wavelength multiplex transmission system according to the first embodiment, the optical transceiver 21 outputs signal light at the wavelength λb. The signal light at the wavelength λb is multiplexed with signal light at another wavelength by the optical multiplexer 22, is amplified by the optical amplifier 24, and is sent out to the fiber-optic transmission line 32. FIG. 1 shows a case where no signal light at another wavelength is inputted to the optical multiplexer 22. The signal light is amplified by the Raman amplifier 34, passes through the signal light interruption detection device 36, is amplified by the optical amplifier 15, and is inputted to the optical demultiplexer 13. The signal light inputted to the optical demultiplexer 13 is demultiplexed and signal light at the wavelength λb obtained by the demultiplexing is inputted to the optical transceiver 11.

Figure 2:
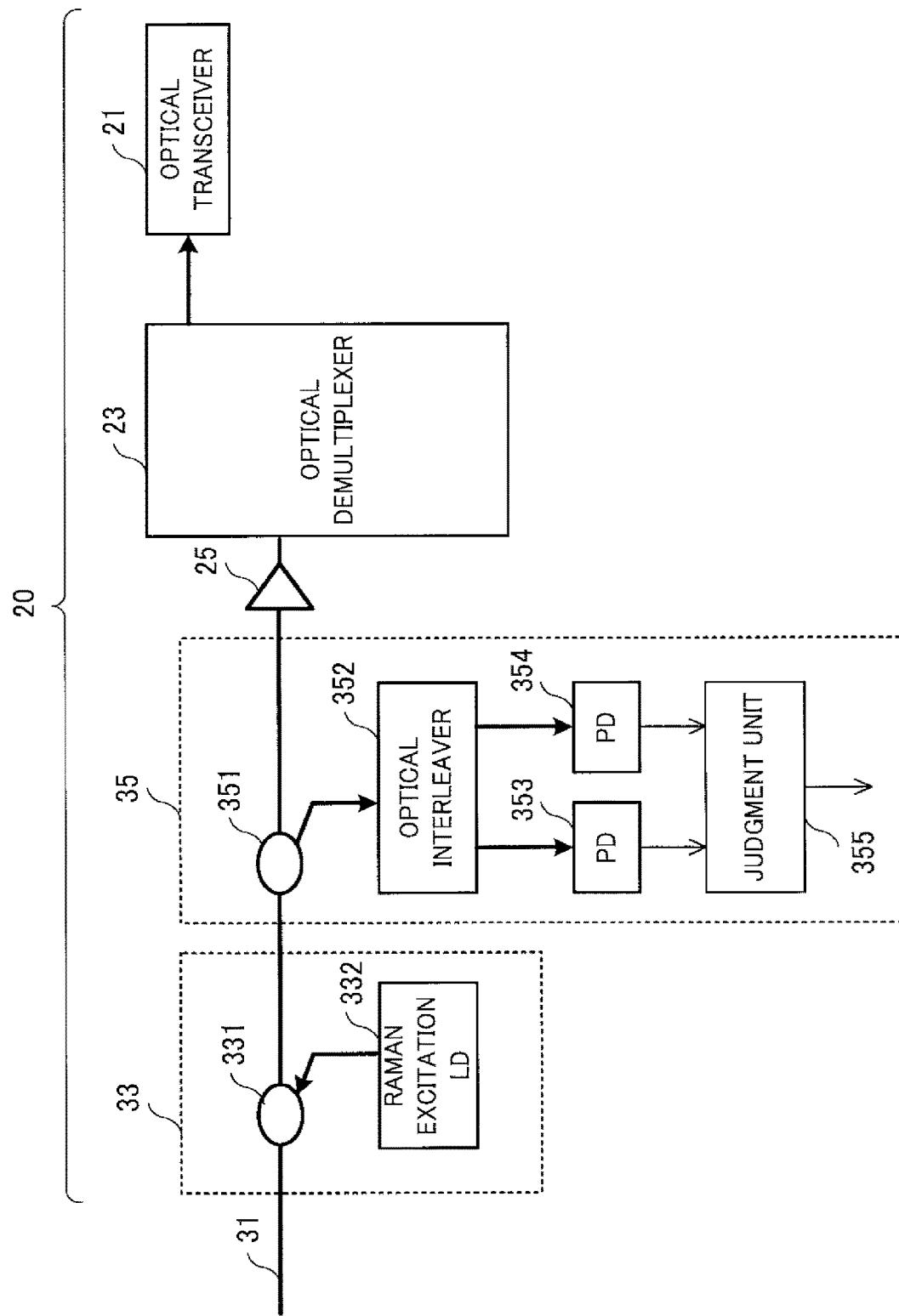
FIG. 2 is a diagram schematically showing a configuration of a signal light interruption detection device according to the first embodiment.

FIG. 2 is a diagram schematically showing a configuration of the signal light interruption detection device 35 according to the first embodiment. FIG. 2 also shows a configuration of the Raman amplifier 33 for amplifying signal light. The optical wavelength multiplex transmission device 20 has a configuration as an opposite configuration of the optical wavelength multiplex transmission device 10. The optical wavelength multiplex transmission device 20 and the optical wavelength multiplex transmission device 10 can have substantially the same configuration. As shown in FIG. 2, the optical wavelength multiplex transmission device 20 includes the Raman amplifier 33 and the signal light interruption detection device 35. The Raman amplifier 33 and the signal light interruption detection device 35 may be devices separate from the optical wavelength multiplex transmission device 20. Such a configuration will be described later in a third embodiment.

Figure 3:
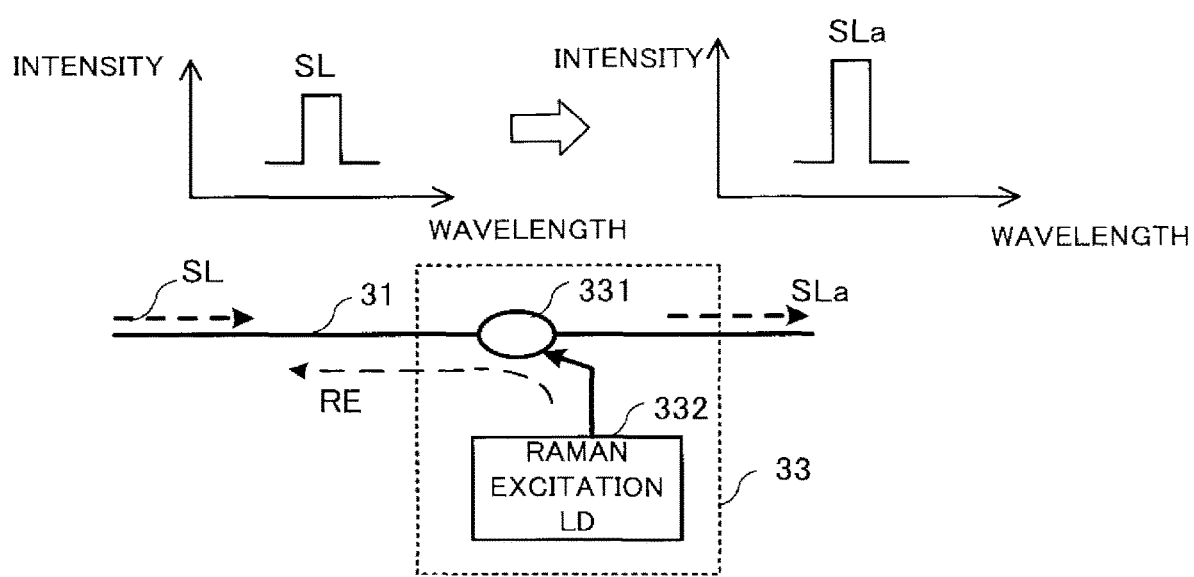
FIG. 3 is a diagram showing amplification of wavelength-multiplexed light by a Raman amplifier in the first embodiment.

FIG. 3 is a diagram showing the amplification of signal light by the Raman amplifier 33 in the first embodiment. As shown in FIG. 2 and FIG. 3, the Raman amplifier 33 includes an optical coupler 331 and a Raman excitation LD (Laser Diode) 332 that outputs Raman excitation light RE. The Raman amplifier 33 amplifies the signal light SL by outputting the Raman excitation light RE to the fiber-optic transmission line 31 via the optical coupler 331. The Raman amplifier 33 outputs the Raman excitation light RE in a direction opposite to the transmission direction from the optical transceiver 11 to the optical transceiver 21. The signal light SL transmitted from the transmitting station's side is amplified by receiving amplification energy from an excitation level in a core excited by the Raman excitation light RE in the fiber-optic transmission line 31. In other words, the loss in the signal light SL transmitted from the transmitting station's side in the fiber-optic transmission line 31 is reduced by the Raman excitation light. RE. The signal light SLa amplified by the Raman amplifier 33 is transmitted through the fiber-optic transmission line 31 while maintaining an excellent OSNR and is inputted to the optical amplifier 25, the optical demultiplexer 23 and the optical transceiver 21 in the optical wavelength multiplex transmission device 20 on the receiving side.

In the Raman amplifier 33, the signal light (Raman amplification light) SLa amplified by the Raman excitation light RE in the fiber-optic transmission line 31 eventually reverts to the level of the signal light SL, whereas light in bands not used for the excitation of the signal light does not revert to the level of the signal light and is emitted to the transmitting side and the receiving side as noise light components. While an EDFA as the optical amplifier 14 is arranged in the optical wavelength multiplex transmission device 10 on the transmitting side, the inputting of the Raman excitation light RE and the ASE noise light components to the EDFA from the fiber-optic transmission line 31 is blocked since an input unit of the EDFA is equipped with an optical isolator.

As shown in FIG. 2, the signal light interruption detection device 35 includes an optical coupler 351 that branches off part of the signal light, an optical interleaver 352 as an optical passive clement, a PD (photodiode) 353 as a photoelectric transducer used as a first optical detector, a PD 354 as a photoelectric transducer used as a second optical detector, and a judgment unit 355 that makes a judgment based on a difference obtained by subtracting the value of a signal outputted from the PD 354 from the value of a signal outputted from the PD 353.

Figure 4:
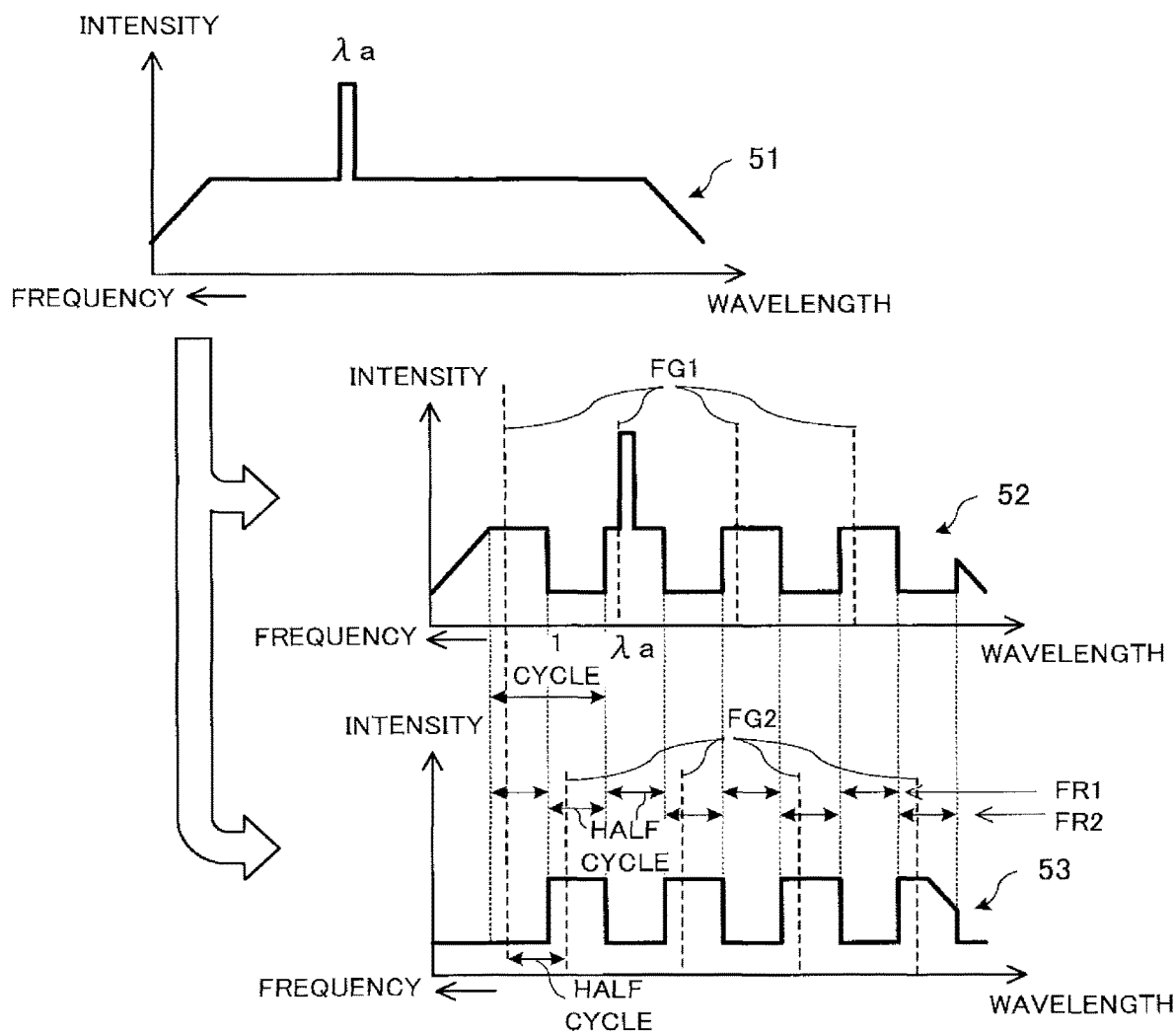
FIG. 4 is a diagram showing a spectrum of wavelength-multiplexed light inputted to the signal light interruption detection device according to the first embodiment and spectra of a main signal light component and noise light components as the wavelength-multiplexed light after undergoing demultiplexing.
Figure 5:
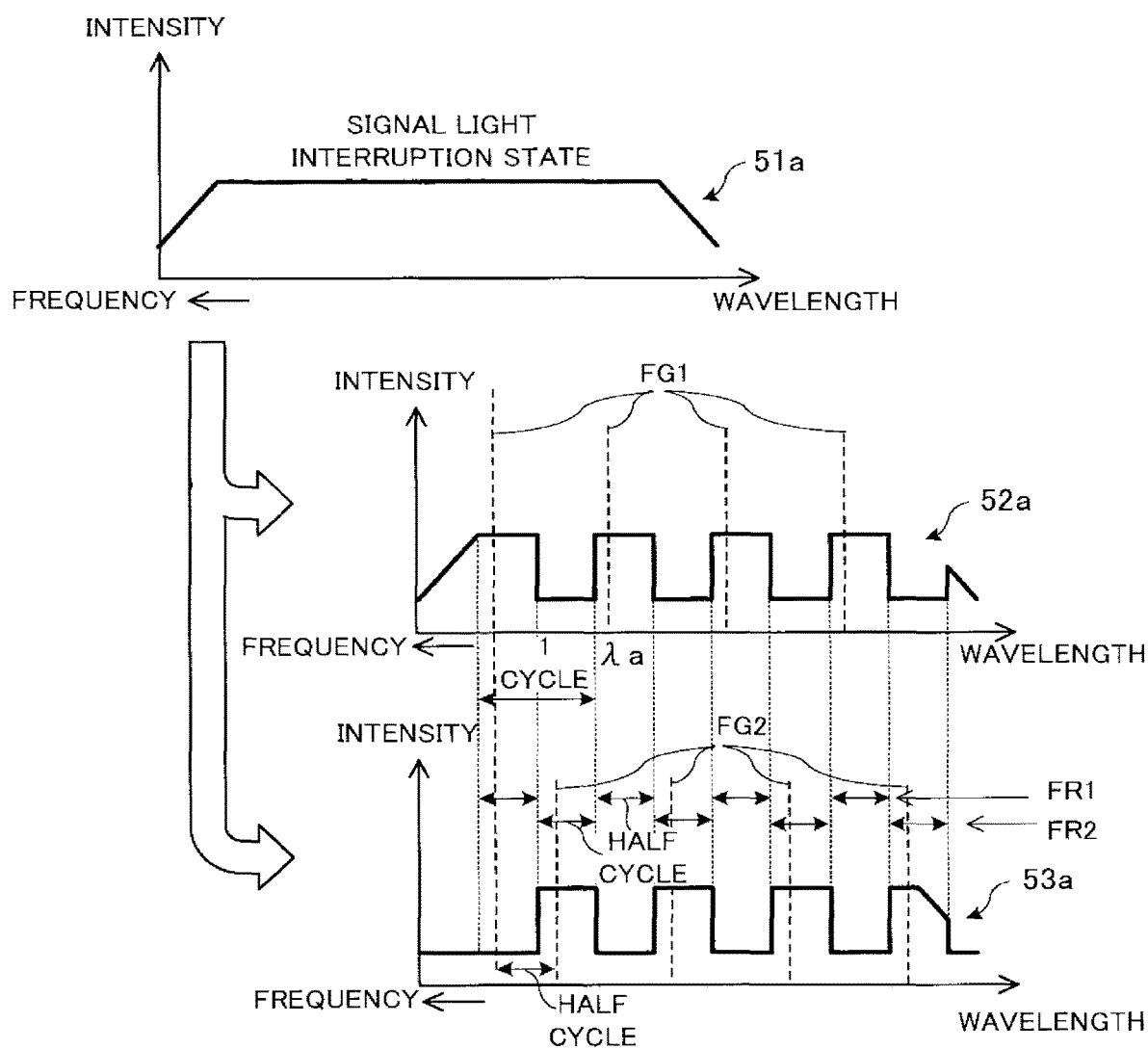
FIG. 5 is a diagram showing a spectrum of wavelength-multiplexed light inputted to the signal light interruption detection device according to the first embodiment and spectra of the main signal light component and the noise light components as the wavelength-multiplexed light after undergoing the demultiplexing in a signal light interruption state.

FIG. 4 is a diagram showing a spectrum 51 of wavelength-multiplexed light as the signal light inputted to the signal light interruption detection device 35 according to the first embodiment and spectra 52 and 53 of the main signal light component and the noise light (noise) components as the wavelength-multiplexed light after undergoing the demultiplexing. FIG. 5 is a diagram showing a spectrum of wavelength-multiplexed light inputted to the signal light interruption detection device 35 according to the first embodiment and spectra of the main signal light component and the noise light (noise) components as the wavelength-multiplexed light after undergoing the demultiplexing in the signal light interruption state.

As shown in FIG. 2 or FIG. 4, the optical interleaver 352 demultiplexes the wavelength-multiplexed light (spectrum 51) branched off by the optical coupler 351 into light in first frequency ranges (referred to also as "first wavelength ranges") FR1 (spectrum 52) corresponding to a first frequency grid (referred to also as a "first wavelength grid") FG1 including frequencies at regular frequency intervals in which the main signal light component (wavelength λa) can be arranged and light in second frequency ranges (referred to also as "second wavelength ranges") FR2 (spectrum 53) corresponding to a second frequency grid (referred to also as a "second wavelength grid") FG2 shifted from the first frequency grid FG1 by a half cycle of the regular frequency intervals (half wavelength). The PD 353 detects first light power as the total power of the light in the first frequency ranges FR1 (spectrum 52) and outputs a first signal corresponding to the first light power. The PD 354 detects second light power as the total power of the light in the second frequency ranges FR2 (spectrum 53) and outputs a second signal corresponding to the second light power. The judgment unit 355 outputs a notification signal based on the difference between the first signal corresponding to the first light power detected by the PD 353 and the second signal corresponding to the second light power detected by the PD 354. For example, the judgment unit 355 outputs a notification signal indicating the signal light interruption state in which no main signal light component exists in the signal light when the difference obtained by subtracting the value (voltage value) of the signal outputted from the PD 354 from the value (voltage value) of the signal outputted from the PD 353 (or the absolute value of the difference between the values of the signals outputted from the PDs 353 and 354) is less than or equal to a predetermined threshold value.

Inputted to the optical wavelength multiplex transmission device 20 on the receiving side, are the main signal light component (wavelength λa) transmitted from the optical transceiver 11, the ASE noise light components emitted from the EDFA as the optical amplifier 14 of the optical wavelength multiplex transmission device 10, and the ASE noise light components excited by the Raman amplifier 33 and reverting to the level of the main signal light component. When the main signal light component (wavelength λa) exists, there occurs a difference between the voltage value corresponding to the first light power of the light in the first frequency ranges FR1 (spectrum 52 in FIG. 4) including the main signal light component (wavelength λa) and the noise light components and the voltage value corresponding to the second light power of the light in the second frequency ranges FR2 (spectrum 53 in FIG. 4) including only the noise light components, or the difference becomes large, and thus whether the main signal light component (wavelength λa) exists or, not can be judged based on the difference.

In cases of extinction of the main signal light component (wavelength λa) due to attenuation in the middle of transmission or the like (LOS: Loss Of Signal), disconnection of the fiber-optic transmission line 31 in the middle, etc., the signal light interruption state, in which no main signal light component (wavelength λa) exists, occurs as indicated by the light in FIG. 5 (spectrum 51*e* in FIG. 5). However, in cases where the Raman excitation light is inputted from the Raman amplifier to the fiber-optic transmission line 31, the noise light components exist in the fiber-optic transmission line 31 even in the signal light interruption state. Thus, as shown in FIG. 5, when no main signal light component (wavelength λa) exists, the difference between the voltage value corresponding to the first light power of the light in the first frequency ranges FR1 (spectrum 52*a* in FIG. 5) including only the noise light components and the voltage value corresponding to the second light power of the light in the second frequency ranges FR2 (spectrum 53*a* in FIG. 5) including only the noise light components becomes smaller than the threshold value.

In the signal light interruption detection device 35 according to the first embodiment, the judgment unit 355 judges whether the signal light interruption state in which no main signal light component (wavelength λa) exists has occurred or not based on a voltage value corresponding to a light power difference obtained by subtracting the total value of the second light power of the light in the second frequency ranges FR2 in which the main signal light component (wavelength λa) is not arranged from the total value of the first light power of the light in the first frequency ranges FR1 in which the main signal light component (wavelength λa) is arranged, and thus the judgment on the signal light interruption state with high reliability becomes possible even when the power of the noise light components is high.

Further, when ASE noise light components in frequency ranges other than the first frequency ranges FR1 including the main signal light component have been extracted, there are cases where the total light power of the ASE noise light components is unstable. In the first embodiment, the total light power of the ASE noise light components is stable since noise light components in frequency ranges other than the first frequency ranges FR1 including the main signal light component are detected in the second frequency ranges FR2 corresponding to a frequency grid similar to the frequency grid of the first frequency ranges FR1 and shifted from the first frequency ranges FR1 by a half cycle. Therefore, the judgment unit 355 is capable of making a highly reliable judgment on the signal light interruption state based on the voltage value corresponding to the light power difference obtained by subtracting the total value of the second light power in the second frequency ranges FR2 in which the main signal light component (wavelength λa) is not arranged from the total, value of the first light power in the first frequency ranges FR1 in which the main signal light component (wavelength λa) is arranged.

Furthermore, there are cases where the level of the main signal light component (wavelength λa) becomes just slightly higher than the level of the noise light components in the same band, and as these levels become close to each other, the difference between total power obtained by extracting the main signal light component (a total voltage level as an object of comparison, the level of the main signal light component and the noise light components added together) and total power obtained by extracting the noise light components (a total voltage level as an object of comparison, the level of only the noise light components) decreases and the judgment on whether the signal light interruption state has occurred or not can be difficult. However, in the first embodiment, the difference in the total power between the main signal light component and the noise light components can be made large since the total power of the noise light components separated by the optical interleaver 352 is approximately half of the total power of the noise light components before the separation.

According to the first embodiment, in the optical wavelength multiplex transmission system equipped with a Raman amplifier, the main signal light component and the noise light components are extracted by using the optical interleaver 352 as an optical passive element and the signal light interruption state (disconnection of the transmission line and occurrence of LOS) can be detected by performing the photoelectric conversion on the optical output from the optical interleaver 352 and making a comparison. Therefore, highly reliable and high-speed detection of the signal light interruption state is possible in an optical wavelength multiplex transmission system employing main signal lights arranged at periodical wavelength intervals without using complicated control.

Further, according to the first embodiment, by use of the optical interleaver 352, it becomes possible to extract the level of the bands including the main signal light component at cycles of the frequencies of the main signal light components in the wavelength multiplex transmission while also extracting and using the level of the bands of the components shifted by the half cycle as the noise light components, and thus the noise light components, which have been hard to extract at a stable level, can be easily and stably extracted and used.

Furthermore, according to the first embodiment, the number of components can be reduced, and thus it is possible to obtain an effect of achieving cost reduction in regard to the means for disconnection detection and determination of LOS signal occurrence.

Moreover, according to the first embodiment, the total power of the noise after the separation by the optical interleaves 352 can be made as low as approximately half of the total power of the noise before the separation, and thus a highly reliable comparison can be made by widening the total power difference between the main signal light component and the noise light components. Accordingly, highly reliable and high-speed detection of the signal light interruption state is possible.

Second Embodiment

In the first embodiment, the description was given of a case where signal light in which a main signal light component at a single wavelength exists is transmitted. In a second embodiment, a description will be given of an optical wavelength multiplex transmission system (fiber-optic communication system) in which lights at multiple wavelengths are multiplexed and multistage repeaters are used.

Figure 6:
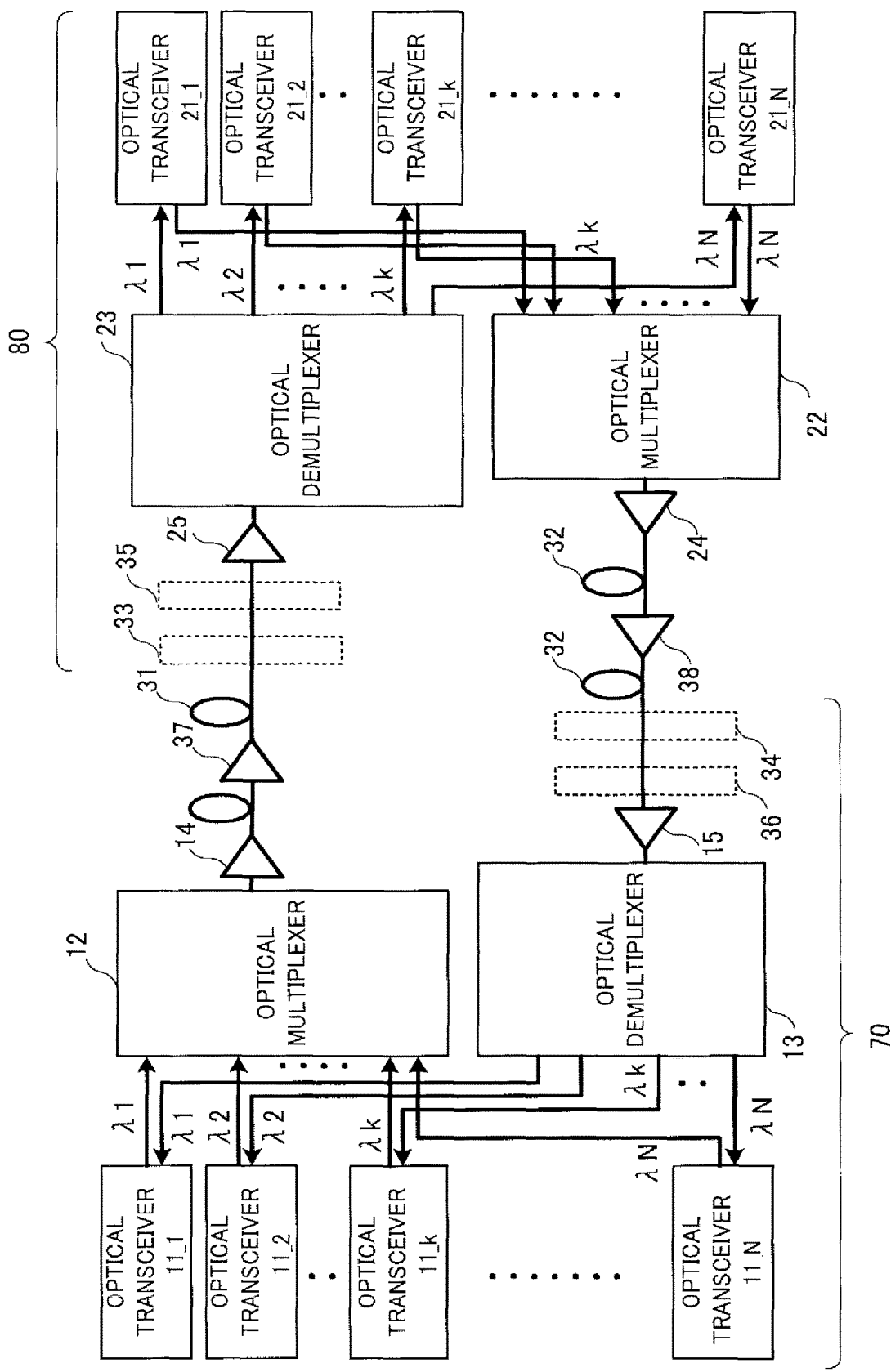
FIG. 6 is a diagram schematically showing configurations of an optical wavelength multiplex transmission device and an optical wavelength multiplex transmission system according to a second embodiment of the present invention.

FIG. 6 is a diagram schematically showing configurations of an optical wavelength multiplex transmission device and an optical wavelength multiplex transmission system according to the second embodiment of the present invention. In FIG. 6, each component identical or corresponding to a component shown in FIG. 1 is assigned the same reference character, as in FIG. 1. The optical wavelength multiplex transmission system according to the second embodiment is a fiber-optic communication system in which wavelength-multiplexed light is transmitted via fiber-optic transmission lines. An optical wavelength multiplex transmission device 70 according to the second embodiment differs from the optical wavelength multiplex transmission device 10 according to the first embodiment in including a plurality of optical. transceivers 11_1, . . . , 11_$k$, . . . , 11_N respectively transmitting and receiving signal lights at wavelengths λ1, . . . , λ$k$, . . . , λN. An optical wavelength multiplex transmission device 80 according to the second embodiment differs from the optical wavelength multiplex transmission device 20 according to the first embodiment in including a plurality of optical transceivers 21_1, . . . , 21_$k$, . . . , 21_N respectively transmitting and receiving signal lights at wavelengths λ1, . . . , λ$k$, . . . , λN. Incidentally, N is a positive integer representing a multicarrier number and k is an integer larger than or equal to 1 and smaller than or equal to N.

In the optical wavelength multiplex transmission system according to the second embodiment, each optical transceiver 11_$k$ (k=1, 2, . . . , N) outputs signal light at a wavelength λk. The signal lights at the wavelengths λ1, . . . , λ$k$, . . . , λN are multiplexed by the optical multiplexer 12 into wavelength-multiplexed light, amplified by the optical amplifier 14, and sent out to the fiber-optic transmission line 31. The wavelength-multiplexed light is amplified by an EDFA as an optical amplifier 37, is amplified by the Raman amplifier 33, passes through the signal light interruption detection device 35, is amplified by the optical amplifier 25, and is inputted to the optical demultiplexer 23. The wavelength-multiplexed light inputted to the optical demultiplexer 23 is demultiplexed, and signal lights at the wavelengths λ1, . . . , λ$k$, . . . , λN obtained by the demultiplexing are respectively inputted to the optical transceivers 21_1, . . . , 21_$k$, . . . , 21_N.

Further, in the optical wavelength multiplex transmission system according to the second embodiment, each optical transceiver 21_$k$ (k=1, 2, . . . , N) outputs signal light at the wavelength λk. The signal lights at the wavelengths λ1, . . . , λk, . . . , λN are multiplexed by the optical multiplexer 22 into wavelength-multiplexed light, amplified by the optical amplifier 24, and sent out to the fiber-optic transmission line 32. The wavelength-multiplexed light is amplified by an EDFA as an optical amplifier 38, is amplified by the Raman amplifier 34, passes through the signal light interruption detection device 36, is amplified by the optical amplifier 15, and is inputted to the optical demultiplexer 13. The wavelength-multiplexed light inputted to the optical demultiplexer 13 is demultiplexed, and signal lights at the wavelengths λ1, . . . , λk, . . . , λN obtained by the demultiplexing are respectively inputted to the optical transceivers 11_1, . . . , 11_$k$, . . . , 11_N.

Figure 7:
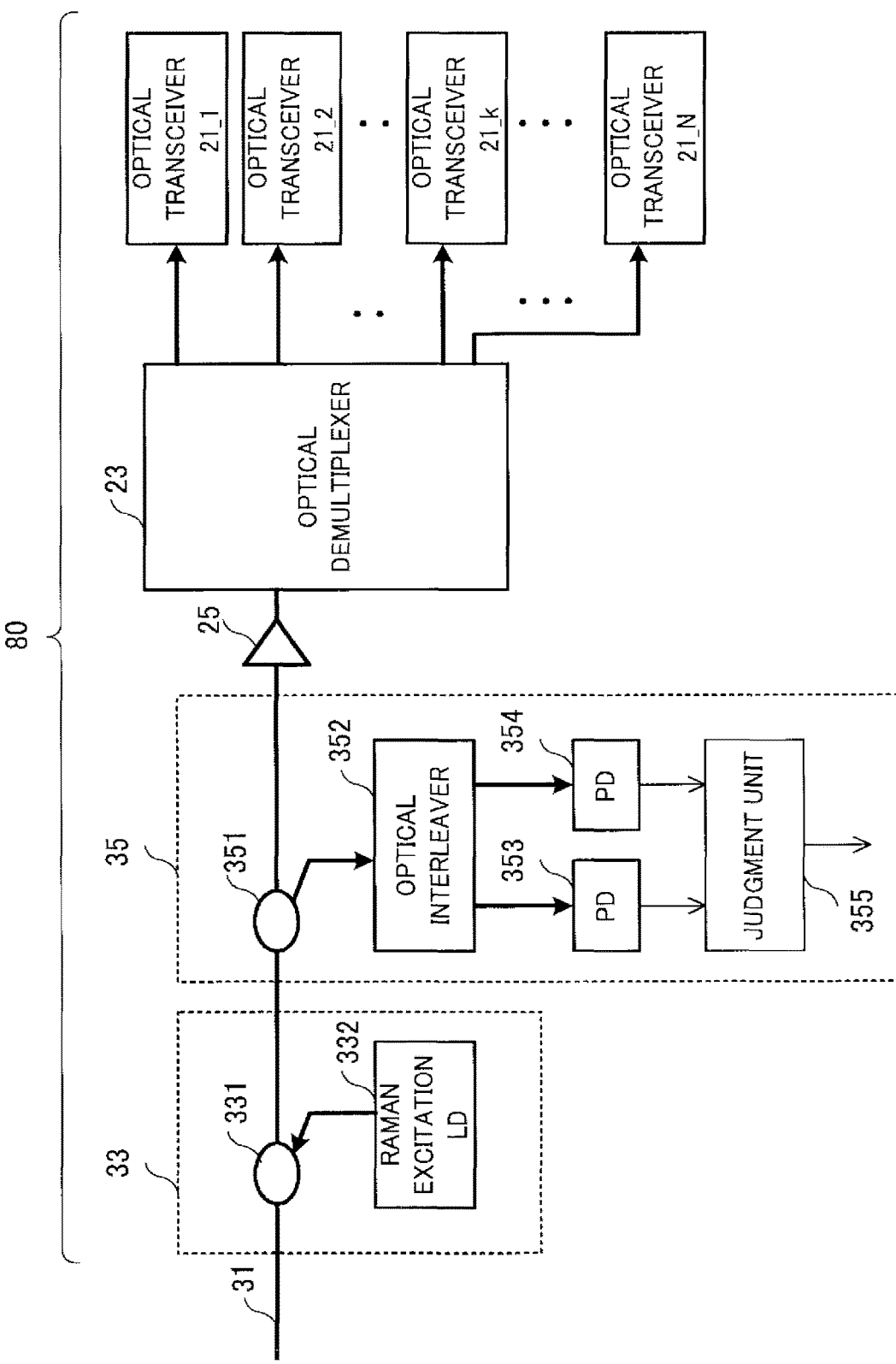
FIG. 7 is a diagram schematically showing a configuration of a signal light interruption detection device according to the second embodiment.

FIG. 7 a diagram schematically showing the configuration of the signal light interruption detection device 35 according to the second embodiment. FIG. 7 also shows the configuration of the Raman amplifier 33 for amplifying signal light. In FIG. 7, each component identical or corresponding to a component shown in FIG. 2 is assigned the same reference character as in FIG. 2. The optical wavelength multiplex transmission device 80 has a configuration as an opposite configuration of the optical wavelength multiplex transmission device 70. The optical wavelength multiplex transmission device 80 and the optical wavelength multiplex transmission device 70 can have substantially the same configuration. As shown in FIG. 7, the optical wavelength multiplex transmission device 80 includes the Raman amplifier 33 and the signal light interruption detection device 35. The Raman amplifier 33 and the signal light interruption detection device 35 may be devices separate from the optical wavelength multiplex transmission device 80.

Figure 8:
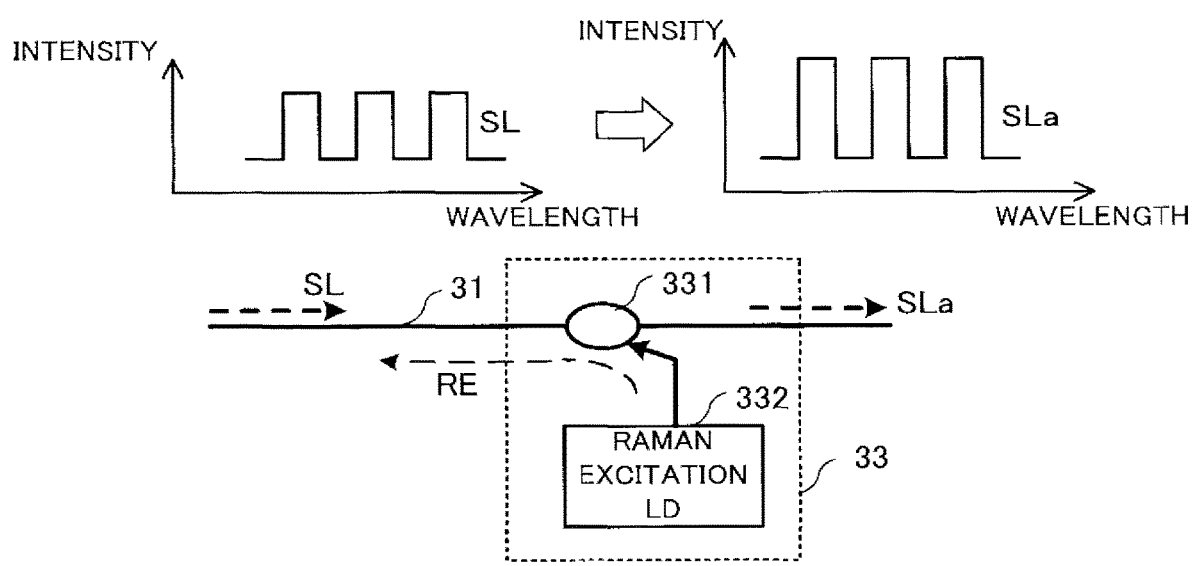
FIG. 8 is a diagram showing amplification of wavelength-multiplexed light by a Raman amplifier in the second embodiment.

FIG. 8 is a diagram showing the amplification of signal light by the Raman amplifier 33 in the second embodiment. As shown in FIG. 7 and FIG. 8, the Raman amplifier 33 includes an optical coupler 331 and a Raman excitation LD (Laser Diode) 332 that outputs Raman excitation light RE. The Raman amplifier 33 amplifies the signal light SL by outputting the Raman excitation light RE to the fiber-optic transmission line 31 via the optical coupler 331. The Raman amplifier 33 outputs the Raman excitation light RE in a direction opposite to the transmission direction from the optical transceiver 11 to the optical transceiver 21. The signal light SL transmitted from the transmitting station's side is amplified by receiving amplification energy from an excitation level in a core excited by the Raman excitation light RE in the fiber-optic transmission line 31. In other words, the loss in the signal light SL transmitted from the transmitting station's side in the fiber-optic transmission line 31 is reduced by the Raman excitation light RE. The signal light SLa amplified by the Raman amplifier 33 is transmitted through the fiber-optic transmission line 31 while maintaining an excellent OSNR and is inputted to the optical amplifier 25, the optical demultiplexer 23 and the optical transceiver 21 in the optical wavelength multiplex transmission device 80 on the receiving side.

In the Raman amplifier 33, the signal light (Raman amplification light) SLa amplified by the Raman excitation light RE in the fiber-optic transmission line 31 eventually reverts to the level of the signal light SL, whereas light in bands not used for the excitation of the signal light does not revert to the level of the signal light and is emitted to the transmitting side and the receiving side as noise light components. While an EDFA as the optical amplifier 14 is arranged in the optical wavelength multiplex transmission device 70 on the transmitting side, the inputting of the Raman excitation light RE and the ASE noise light components to the EDFA from the fiber-optic transmission line 31 is blocked since the input unit of the EDFA is equipped with an optical isolator.

As shown in FIG. 7, the signal light interruption detection device 35 includes an optical coupler 351 that branches off part of the wavelength-multiplexed light, an optical interleaver 352 as an optical passive element, a PD (photodiode) 353 as a photoelectric transducer used as a first optical detector, a PD 354 as a photoelectric transducer used as a second optical detector, and a judgment unit 355 that makes a judgment based on a difference obtained by subtracting the value of a signal outputted from the PD 354 from the value of a signal outputted from the PD 353.

Figure 9:
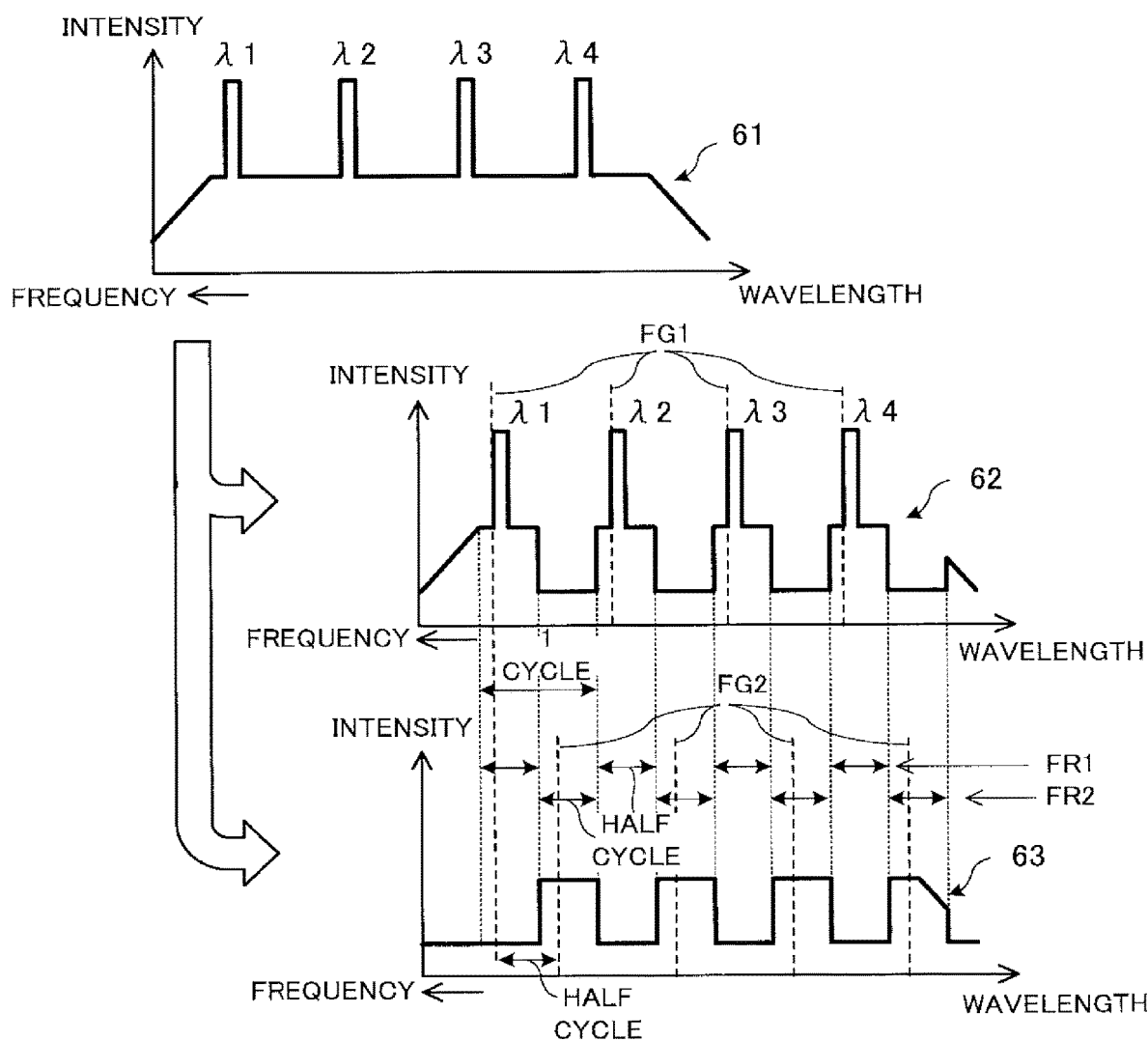
FIG. 9 is a diagram showing a spectrum of wavelength-multiplexed light inputted to the signal light interruption detection device according to the second embodiment and spectra of main signal light components and noise light components as the wavelength-multiplexed light after undergoing demultiplexing.
Figure 10:
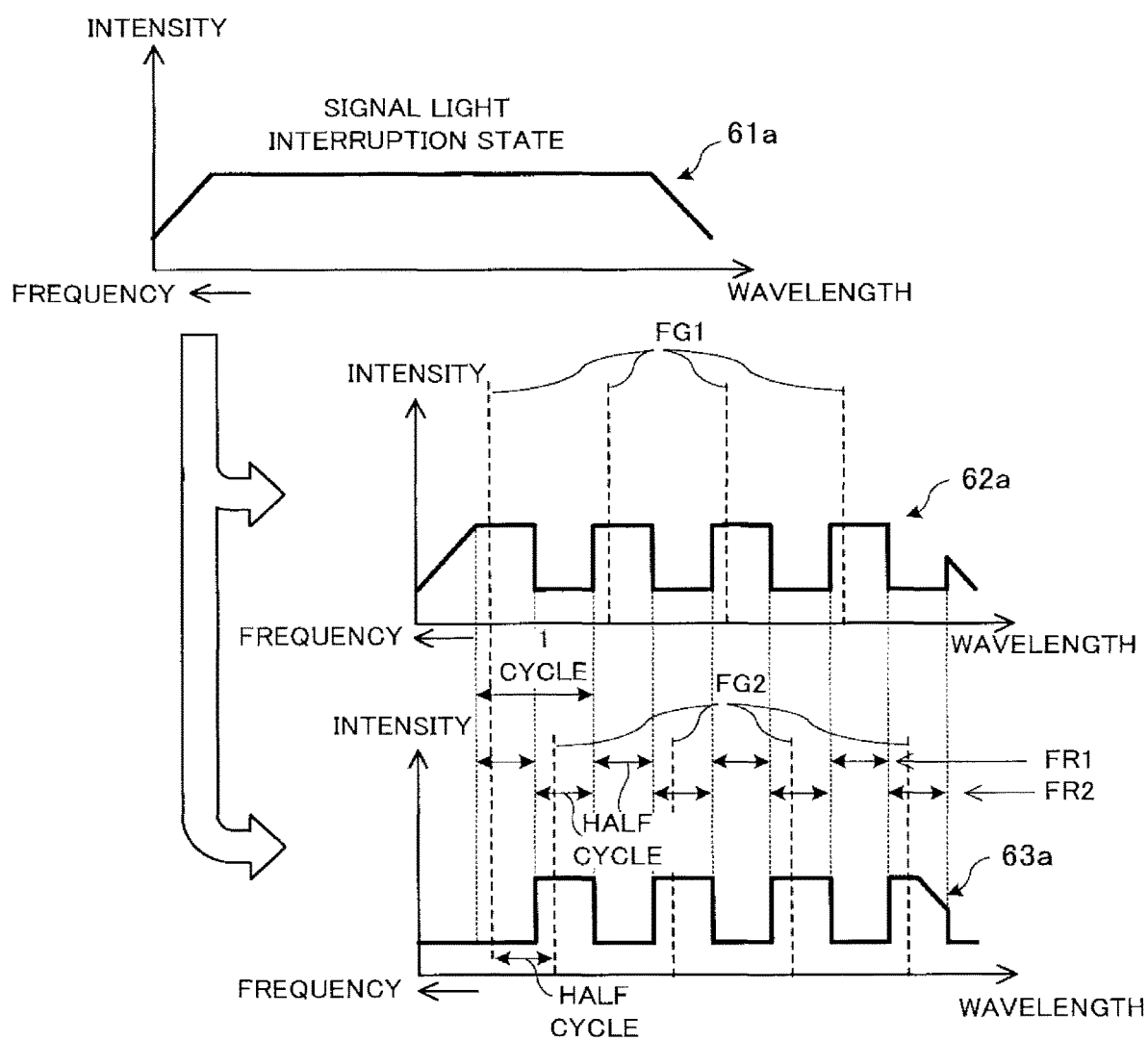
FIG. 10 is a diagram showing a spectrum of wavelength-multiplexed inputted to the signal light interruption detection device according to the second embodiment and spectra of the main signal light components and the noise light components as the wavelength-multiplexed light after undergoing the demultiplexing in the signal light interruption state.

FIG. 9 is a diagram showing a spectrum 61 of wavelength-multiplexed light as the signal light inputted to the signal light interruption detection device 35 according to the second embodiment and spectra 62 and 63 of main signal light components and noise light (noise) components as the wavelength-multiplexed light after undergoing the demultiplexing. FIG. 10 is a diagram showing a spectrum of wavelength-multiplexed light inputted to the signal light interruption detection device 35 according to the second embodiment and spectra of the main signal light components and the noise light (noise) components as the wavelength-multiplexed light after undergoing the demultiplexing in the signal light interruption state.

As shown in FIG. 7 or FIG. 9, the optical interleaver 352 demultiplexes the wavelength-multiplexed light (spectrum 61) branched off by the optical coupler 351 into light in first frequency ranges (referred to also as "first wavelength ranges") FR1 (spectrum 62) corresponding to a first frequency grid (referred to also as a "first wavelength grid") FG1 including frequencies at regular frequency intervals in which the main signal light components (wavelengths $\lambda 1, \ldots, \lambda k, \ldots, \lambda N$) can be arranged and light in second frequency ranges (referred to also as "second wavelength ranges") FR2 (spectrum 63) corresponding to a second frequency grid (referred to also as a "second wavelength grid") FG2 shifted from the first frequency grid FG1 by a half cycle of the regular frequency intervals (half wavelength). FIG. 9 shows a case where N=4. The PD 353 detects first light power as the total power of the light in the first frequency ranges FR1 (spectrum 62) and outputs a first signal corresponding to the first light power. The PD 354 detects second light power as the total power of the light in the second frequency ranges FR2 (spectrum 63) and outputs a second signal corresponding to the second light power. The judgment unit 355 outputs a notification signal based on the difference between the first signal corresponding to the first light power detected by the PD 353 and the second signal corresponding to the second light power detected by the PD 354. For example, the judgment unit 355 outputs a notification signal indicating the signal light interruption state in which no main signal light components exist in the signal light when the difference obtained by subtracting the value (voltage value) of the signal outputted from the PD 354 from the value (voltage value) of the signal outputted from the PD 353 (or the absolute value of the difference between the values of the signals outputted from the PDs 353 and 354) is less than or equal to a predetermined threshold value.

Inputted to the optical wavelength multiplex transmission device 80 on the receiving side, are the main signal light components (wavelengths $\lambda 1, \ldots, \lambda k, \ldots, \lambda N$) transmitted from the optical transceivers 11_1, ..., 11_k, ..., 11_N, the ASE noise light components emitted from the EDFAs as the optical amplifiers 14 and 37 of the optical wavelength multiplex transmission device 70, and the ASE noise light components excited by the Raman amplifier 33 and reverting to the level of the main signal light components. When the main signal light components (wavelengths $\lambda 1, \ldots, \lambda k, \ldots, \lambda N$) exist, there occurs a difference between the voltage value corresponding to the first light power of the light in the first frequency ranges FR1 (spectrum 62 in FIG. 9) including the main signal light components (wavelengths $\lambda k$) and the noise light components and the voltage value corresponding to the second light power of the light in the second frequency ranges FR2 (spectrum 63 in FIG. 9) including only the noise light components, or the difference becomes large, and thus whether the main signal light components (wavelengths $\lambda 1, \ldots, \lambda k, \ldots, \lambda N$) exist or not can be judged based on the difference.

In cases of extinction of the main signal light components (wavelengths $\lambda 1, \ldots, \lambda k, \ldots, \lambda N$) due to attenuation in the middle of transmission or the like (LOS), disconnection of the fiber-optic transmission line 31 in the middle, etc., the signal light interruption state, in which no main signal light components (wavelengths $\lambda 1, \ldots, \lambda k, \ldots, \lambda N$) exist, occurs as indicated by the light in FIG. 10 (spectrum 61a in FIG. 10). However, in cases where the Raman excitation light is inputted from the Raman amplifier to the fiber-optic transmission line 31, the noise light components exist in the fiber-optic transmission line 31 even in the signal light interruption state. Thus, as shown in FIG. 10, when no main signal light components (wavelengths $\lambda 1, \ldots, \lambda k, \ldots, \lambda N$) exist, the difference between the voltage value corresponding to the first light power of the light in the first frequency ranges FR1 (spectrum 62a in FIG. 10) including only the noise light components and the voltage value corresponding to the second light power of the light in the second frequency ranges FR2 (spectrum 63a in FIG. 10) including only the noise light components becomes smaller than the threshold value.

In the signal light interruption detection device 35 according to the second embodiment, the judgment unit 355 judges whether the signal light interruption state in which no main signal light components (wavelengths $\lambda 1, \ldots, \lambda k, \ldots, \lambda N$) exist has occurred or not based on a voltage value corresponding to a light power difference obtained by subtracting the total value of the second light power of the light in the second frequency ranges FR2 in which the main signal light components (wavelengths $\lambda 1, \ldots, \lambda k, \ldots, \lambda N$) are not arranged from the total value of the first light power of the light in the first frequency ranges FR1 in which the main signal light components (wavelengths $\lambda 1, \ldots, \lambda k, \ldots, \lambda N$) are arranged, and thus the judgment on the signal light interruption state with high reliability becomes possible even when the power of the noise light components is high.

In the second embodiment, the total light power of the ASE noise light components is stable since noise light components in frequency ranges other than the first frequency ranges FR1 including the main signal light components are detected in the second frequency ranges FR2 corresponding to a frequency grid similar to the frequency grid of the first frequency ranges FR1 and shifted from the first frequency ranges FR1 by a half cycle. Therefore, the judgment unit 355 is capable of making a highly reliable judgment on the signal light interruption state based on the voltage value corresponding to the light power difference obtained by subtracting the total value of the second light power in the second frequency ranges FR2 in which the main signal light components (wavelengths $\lambda 1, \ldots, \lambda k, \ldots, \lambda N$) are not arranged from the total value of the first light power in the first frequency ranges FR1 in which the main signal light components (wavelengths $\lambda 1, \ldots, \lambda k, \ldots, \lambda N$) are arranged.

Further, in the second embodiment, the difference in the total power between the main signal light components and the noise light components can be made large since the total power of the noise light components separated by the optical interleaver 352 is approximately half of the total power of the noise light components before the separation. Accordingly, highly reliable and high-speed detection of the signal light interruption state is possible.

Further, according to the second embodiment, in the optical wavelength multiplex transmission system equipped with a Raman amplifier, the main signal light components and the noise light components are extracted by using the optical interleaver 352 and the signal light interruption state (disconnection of the transmission Line and occurrence of LOS) can be detected by performing the photoelectric conversion on the optical output from the optical interleaver 352 and making a comparison. Therefore, highly reliable and high-speed detection of the signal light interruption state is possible in an optical wavelength multiplex transmission system employing main signal lights arranged at periodical wavelength intervals without using complicated control.

Furthermore, according to the second embodiment, the number of components can be reduced, and thus an effect is achieved in that cost reduction is possible in regard to the means for disconnection detection and determination of LOS signal occurrence.

Moreover, in the second embodiment, even in cases where not only a single wavelength signal but a plurality of wavelength components exists in a fiber-optic transmission line of the multistage repeating type, the signal light interruption state can be detected with high reliability irrespective of the wavelength allocation.

Third Embodiment

In the first and second embodiments, the description was given of cases where the optical wavelength multiplex transmission device 20 or 80 on the receiving side is equipped with the Raman amplifier 33 and the signal light interruption detection device 35. In a third embodiment, a description will be given of an optical amplifier 39 (e.g., an optical repeater including an optical amplification unit) having a Raman amplifier 33 and a signal light interruption detection device 35 in the middle of the fiber-optic transmission line 31.

Figure 11:
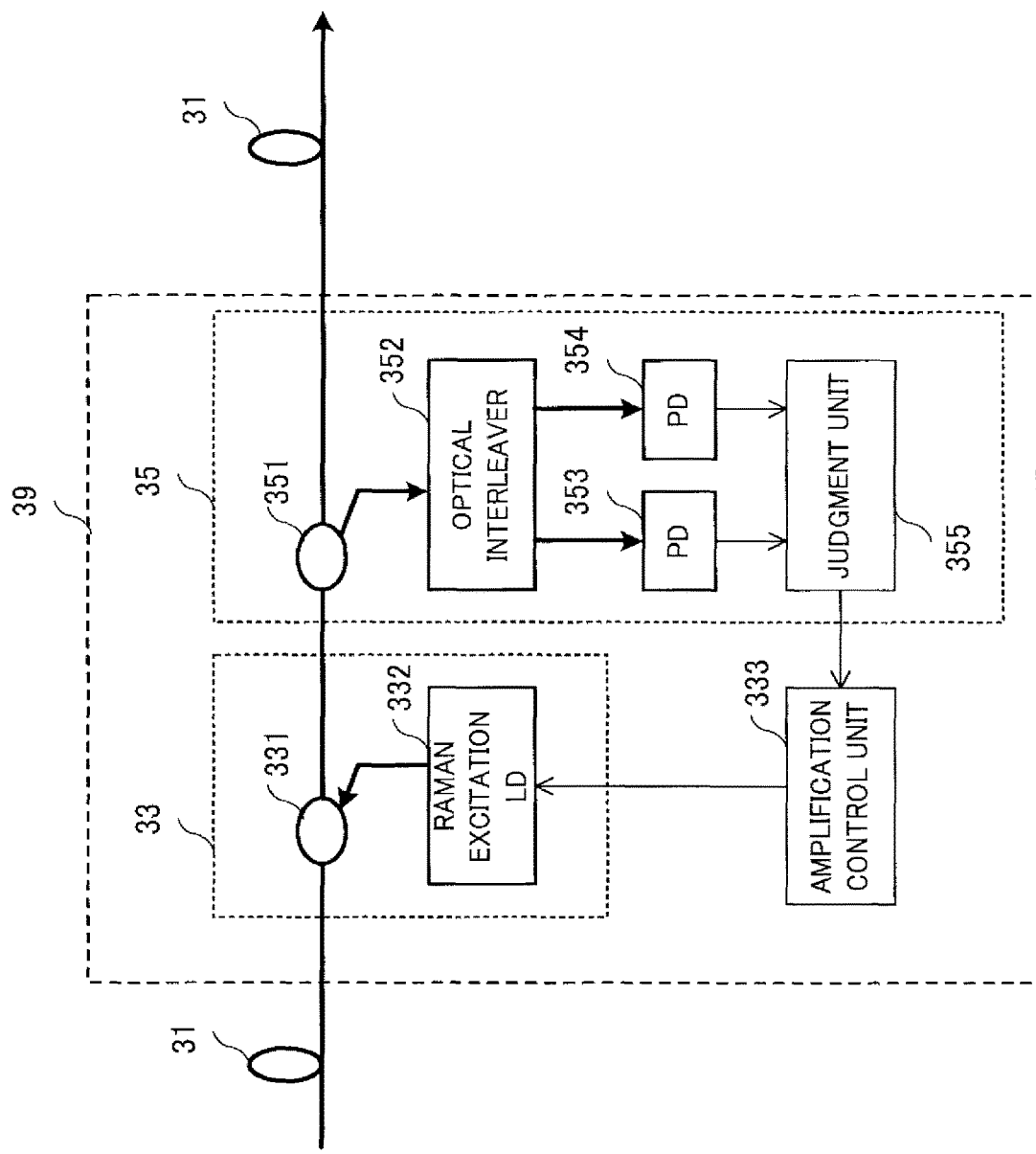
FIG. 11 is a diagram schematically showing a configuration of an optical amplifier according to a third embodiment of the present invention.

FIG. 11 is a diagram schematically showing a configuration of the optical amplifier 39 according to the third embodiment of the present invention. The optical amplifier 39 is independent of the optical wavelength multiplex transmission device 20 or 80, and is a part of an optical repeater, for example. In FIG. 11, each component identical or corresponding to a component shown in FIG. 2 is assigned the same reference character as in FIG. 2. The optical amplifier 39 according to the third embodiment differs from the configuration in the first embodiment in further including an amplification control unit 333 that controls the operation of the Raman amplifier 33 based on a notification signal outputted from the signal light interruption detection device 35. For example, the amplification control unit 333 is capable of changing the intensity of the Raman excitation light outputted from the Raman excitation LD 332 of the Raman amplifier 33 according to information indicated by the notification signal outputted from the signal light interruption detection device 35 (e.g., difference between the outputs of the PD 353 and the PD 354). For example, the amplification control unit 333 may change the intensity of the Raman excitation light outputted from the Raman excitation LD 332 of the Raman amplifier 33 so that the difference between the outputs of the PD 353 and the PD 354 increases. Further, the amplification control unit 333 may perform control so as to stop the outputting of the Raman excitation light from the Raman excitation LD 332 of the Raman amplifier 33 when the notification signal outputted from the signal light interruption detection device 35 is a signal indicating the signal light interruption state.

In the optical amplifier 39 according to the third embodiment, similarly to the cases shown in the first and second embodiments, the judgment on the signal light interruption state with high reliability becomes possible even when the power of the noise light components is high.

Further, in the third embodiment, the difference in the total power between the main signal light components and the noise light components can be made large since the total power of the noise light components separated by the optical interleaver 352 is approximately half of the total power of the noise light components before the separation. Accordingly, highly reliable and high-speed detection of the signal light interruption state is possible.

Further, according to the third embodiment, in the optical wavelength multiplex transmission system equipped with a Raman amplifier, the main signal light components and the noise light components are extracted by using the optical interleaver 352 and the signal light interruption state (disconnection of the transmission line and occurrence of LOS) can be detected by performing the photoelectric conversion on the optical output from the optical interleaver 352 and making a comparison. Therefore, highly reliable and high-speed detection of the signal light interruption state is possible in an optical wavelength multiplex transmission system employing main signal lights arranged at periodical wavelength intervals without using complicated control.

DESCRIPTION OF REFERENCE CHARACTERS

10, 20, 70, 80: optical wavelength multiplex transmission device, 11, 11_k, 21, 21_k: optical transceiver, 12, 22: optical multiplexer, 13, 23: optical demultiplexer, 14, 15, 24, 25, 37, 38: optical amplifier, 31, 32: fiber-optic transmission line, 33, 34: Raman amplifier, 35, 36: signal light interruption detection device, 39: optical amplifier, 51, 51a: signal light (spectrum), 52: main signal light component and noise light components (spectrum), 52a: noise light components (spectrum), 53, 53a: noise light components (spectrum), 61, 61a: multiplexed signal light (spectrum), 62: main signal light components and noise light components (spectrum), 62a: noise light components (spectrum), 63: noise light components (spectrum), 331: optical coupler, 332: Raman excitation LD, 333: amplification control unit, 352: optical interleaver, 353: PD (first optical detector), 354: PD (second optical detector), 355: judgment unit, FG1: first frequency grid, FG2: second frequency grid, FR1: first frequency ranges, FR2: second frequency ranges.

What is claimed is:

1. A signal light interruption detection device comprising:
    an optical interleaver to demultiplex wavelength-multiplexed light into:
        light in first frequency ranges corresponding to a first frequency grid including frequencies at regular frequency intervals in which a main signal light component can be arranged, and
        light in second frequency ranges corresponding to a second frequency grid shifted from the first frequency grid by a half cycle of the regular frequency intervals;
    a first optical detector to detect first light power as total power of the light in the first frequency ranges received from the optical interleaver;
    a second optical detector to detect second light power as total power of the light in the second frequency ranges received from the optical interleaver; and
    a judging circuitry to output a notification signal based on a difference between the first light power detected by the first optical detector and the second light power detected by the second optical detector.

2. The signal light interruption detection device according to claim 1, wherein the judging circuitry outputs the notification signal indicating a signal light interruption state in which no main signal light component exists in the wavelength-multiplexed light when the difference obtained by subtracting a value of a signal outputted from the second optical detector from a value of a signal outputted from the first optical detector is smaller than or equal to a predetermined threshold value.

3. The signal light interruption detection device according to claim 1, further comprising an optical coupler to branch off part of the wavelength-multiplexed light from a fiber-optic transmission line in which the wavelength-multiplexed light is transmitted and provide the part of the wavelength-multiplexed light to the optical interleaver.

4. An optical amplifier comprising:
    a Raman amplifier provided in a fiber-optic transmission line in which wavelength-multiplexed light is transmitted; and
    the signal light interruption detection device according to claim 1 provided in the fiber-optic transmission line downstream of the Raman amplifier.

5. The optical amplifier according to claim 4, further comprising an amplification controlling circuitry to control operation of the Raman amplifier based on the notification signal outputted from the signal light interruption detection device.

6. An optical wavelength multiplex transmission device comprising:
    an optical transceiver;
    an optical demultiplexer to output signal light, obtained by demultiplexing wavelength-multiplexed light transmitted through a fiber-optic transmission line, to the optical transceiver; and
    the signal light interruption detection device according to claim 1 provided in the fiber-optic transmission line.

7. An optical wavelength multiplex transmission system comprising:
    a first optical wavelength multiplex transmission device; and
    a second optical wavelength multiplex transmission device communicatively connected with the first optical wavelength multiplex transmission device via a fiber-optic transmission line,
    wherein at least one of the first optical wavelength multiplex transmission device and the second optical wavelength multiplex transmission device includes:
        an optical transceiver;
        an optical demultiplexer to output signal light, obtained by demultiplexing wavelength-multiplexed light transmitted through the fiber-optic transmission line, to the optical transceiver; and
        the signal light interruption detection device according to claim 1 provided in the fiber-optic transmission line.

8. The signal light interruption detection device according to claim 1, wherein the first optical detector and the second optical detector are disposed immediately downstream of the optical interleaver.

9. The optical amplifier according to claim 4, wherein the signal light interruption detection device is disposed immediately downstream of the Raman amplifier.

* * * * *